(12) United States Patent
Kallio et al.

(10) Patent No.: US 7,860,102 B2
(45) Date of Patent: Dec. 28, 2010

(54) CALL ESTABLISHMENT FOR MULTIMEDIA CALL

(75) Inventors: Juha Kallio, Vantaa (FI); Markku Jylha-Ollila, Helsinki (FI)

(73) Assignee: Nokia Corporation, Espoo (FI)

( * ) Notice: Subject to any disclaimer, the term of this patent is extended or adjusted under 35 U.S.C. 154(b) by 652 days.

(21) Appl. No.: 11/508,258

(22) Filed: Aug. 23, 2006

(65) Prior Publication Data

US 2007/0195802 A1      Aug. 23, 2007

(30) Foreign Application Priority Data

Feb. 20, 2006    (EP) .................................. 06110170

(51) Int. Cl.
*H04L 12/28* (2006.01)
(52) U.S. Cl. .................................. 370/395.2; 370/401
(58) Field of Classification Search .................. 370/352, 370/354
See application file for complete search history.

(56) References Cited

U.S. PATENT DOCUMENTS

| | | | |
|---|---|---|---|
| 2004/0028037 A1* | 2/2004 | Rasanen et al. ............. | 370/354 |
| 2004/0076145 A1* | 4/2004 | Kauhanen et al. ............ | 370/352 |
| 2005/0064821 A1* | 3/2005 | Hedberg et al. .......... | 455/67.11 |
| 2005/0221826 A1 | 10/2005 | Lee | |
| 2007/0070980 A1* | 3/2007 | Phelps et al. ................ | 370/352 |

FOREIGN PATENT DOCUMENTS

| WO | WO 01/76288 A1 | 10/2001 |
|---|---|---|
| WO | WO 03/032587 A1 | 4/2003 |
| WO | WO 2004/086703 A1 | 10/2004 |

OTHER PUBLICATIONS

3GPP TS 23.228 V6.12.0, "*3rd Generation Partnership Project; Technical Specification Group Services and System Aspects; IP Multimedia Subsystem (IMS); Stage 2 (Release 6)*" Dec. 2005, pp. 1-181.

(Continued)

*Primary Examiner*—Chirag G Shah
*Assistant Examiner*—Otis L Thompson, Jr.
(74) *Attorney, Agent, or Firm*—Alston & Bird LLP (57) ABSTRACT

A mechanism for controlling an establishment of a call from a calling party being located in a first communication network environment to a receiving party being located in a second network environment, comprise a determination whether or not information on media parameters supported by the calling party is received in an initialization message for the call, and if the information on media parameters supported by the calling party is not received, a transmission of a specific message based on a service change and fallback function to the receiving party, a receipt, in response to the specific message based on the service change and fallback function, of information on media parameters supported by the receiving party, processing of the information on media parameters supported by the receiving party and a completion of the establishment of the call in correspondence to the media parameters supported by the receiving party and by the calling party.

29 Claims, 6 Drawing Sheets

OTHER PUBLICATIONS

3GPP TS 23.172 V6.3.0, "*3$^{RD}$ Generation Partnership Project; Technical Specification Group Core Network and Terminals; Technical Realization of Circuit Switched (CS) Multimedia Service UDI/RDI Fallback and Service Modification; Stage 2; (Release 6)*", Jun. 2005, pp. 1-57.

Rosenberg, J., et al., "*Best Current Practices for Third Party Call Control (3pcc) in the Session Initiation Protocol (SIP)*" RFC: 3725, Apr. 2004, pp. 1-30.

Itu-T, H.324, "*Series H: Audiovisual and Multimedia Systems infrastructure of Audiovisual Services-Systems Terminal Equipment for Audiovisual Services*", Terminal for Low Bit-Rate Multimedia Communication, Sep. 2005, pp. 72.

3GPP TS 23.172 V5.4.0, "*3$^{RD}$ Generation Partnership Project; Technical Specification Group Core Network; Technical Realization of Circuit Switched (CS) Multimedia Service UDI/RDI Fallback and Service Modification; Stage 2 (Release 5)*", Mar. 2004, pp. 1-42.

International Search Report PCT/IB2007/050209 filed Feb. 20, 2006.

Office Action for Russian Application No. 2008132295/09 dated Mar. 2, 2010.

* cited by examiner

CALL ESTABLISHMENT FOR MULTIMEDIA CALL

BACKGROUND OF THE INVENTION

1. Field of the Invention

The present invention relates to a method of controlling an establishment of a multimedia call between communication equipments in different network environments, a corresponding system, a corresponding computer program product, and a corresponding network control element. In particular, the present invention relates to method, system, computer program product and network control element by means of which a multimedia call, for example a video call, originating from a first network environment, such as an IP multimedia subsystem, to a receiving party being located in a second network environment, such as a circuit switched (CS) communication network system, can be successfully established.

For the purpose of the present invention to be described herein below, it should be noted that

- a communication equipment may for example be any device by means of which a user may access a communication network; this implies mobile as well as non-mobile devices and networks, independent of the technology platform on which they are based; only as an example, it is noted that communication equipments operated according to principles standardized by the $3^{rd}$ Generation Partnership Project 3GPP and known for example as UMTS terminals are particularly suitable for being used in connection with the present invention;
- although reference was made herein before to video call, this exemplifies only a specific example of content; content as used in the present invention is intended to mean multimedia data of at least one of audio data, video data, image data, text data, and meta data descriptive of attributes of the audio, video, image and/or text data, any combination thereof or even, alternatively or additionally, other data such as, as a further example, program code of an application program to be accessed/downloaded;
- method steps likely to be implemented as software code portions and being run using a processor at one of the entities described herein below are software code independent and can be specified using any known or future developed programming language;
- method steps and/or devices likely to be implemented as hardware components at one of the entities are hardware independent and can be implemented using any known or future developed hardware technology or any hybrids of these, such as MOS, CMOS, BiCMOS, ECL, TTL, etc, using for example ASIC components or DSP components, as an example;
- generally, any method step is suitable to be implemented as software or by hardware without changing the idea of the present invention;
- devices or means can be implemented as individual devices or means, but this does not exclude that they are implemented in a distributed fashion throughout the system, as long as the functionality of the device is preserved.

2. Related Prior Art

In the last years, an increasingly extension of communication networks, e.g. of wire based communication networks, such as the Integrated Services Digital Network (ISDN), or wireless communication networks, such as the cdma2000 (code division multiple access) system, cellular 3rd generation (3G) communication networks like the Universal Mobile Telecommunications System (UMTS), cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN), took place all over the world. Various organizations, such as the $3^{rd}$ Generation Partnership Project (3GPP), the International Telecommunication Union (ITU), $3^{rd}$ Generation Partnership Project 2 (3GPP2), Internet Engineering Task Force (IETF), and the like are working on standards for telecommunication network and multiple access environments.

In general, the system structure of a communication network is such that one party, e.g. a subscriber's communication equipment, such as a mobile station, a mobile phone, a fixed phone, a personal computer (PC), a laptop, a personal digital assistant (PDA) or the like, is connected via transceivers and interfaces, such as an air interface, a wired interface or the like, to an access network subsystem. The access network subsystem controls the communication connection to and from the communication equipment and is connected via an interface to a corresponding core or backbone network subsystem. The core (or backbone) network subsystem switches the data transmitted via the communication connection to a destination party, such as another communication equipment, a service provider (server/proxy), or another communication network. It is to be noted that the core network subsystem may be connected to a plurality of access network subsystems. Depending on the used communication network, the actual network structure may vary, as known for those skilled in the art and defined in respective specifications, for example, for UMTS, GSM and the like.

Generally, for properly establishing and handling a communication connection between network elements such as the communication equipment and another communication equipment or terminal, a database, a server, etc., one or more intermediate network elements such as control network elements, support nodes or service nodes are involved.

One application whose importance for current and future communication systems increases are multimedia communication services. A multimedia call is a communication where, for example, sound (voice), text and picture are used simultaneously. Multimedia calls generally require the transmission of several different types of data (video, audio, and the like) in parallel, and these data are to be transmitted and received by various different types of communication equipments or network elements, so that it is required that plural communication protocols are negotiated and appropriate parameters for the communication are adjusted.

In 3G networks, it is mandated by the 3GPP to use a 3G bandwidth guaranteed circuit switched bearer. Furthermore, as the standard to be used for such a multimedia communication, a 3G-324M system is to be employed. The 3G-324M system represents a derivate of the ITU-T H.324 protocol which in turn requires the employment of several further components or protocols. The general procedures for establishing a multimedia communication are known for those skilled in the art so that a detailed description thereof is omitted herein.

A current technology to merge the Internet with the cellular telecommunication world is the Internet Protocol (IP) Multimedia Subsystem IMS. The goal is to make available services offered by the Internet nearly everywhere by means of cellular mobile communication systems. IMS is introduced as part of the 3GPP standards since Release 5. As a part of the signaling mechanisms used between the IMS and an user equipment the Session Initiation Protocol SIP is used. Details of the structure and procedures executed in IMS are described in the related standards and are commonly known to a person skilled in the art so that a description thereof is omitted herein for the sake of simplicity.

It is expected that current circuit switched networks evolve towards the IMS in the coming years. Thus, for a relatively long period of time both CS networks and IMS will be used side by side. Hence, it is necessary to ensure interworking between the both systems so that an end user experience is not jeopardized. For example, when Voice over IP (VoIP) calls are available in IMS then the interworking between IMS and CS networks for voice calls must be possible. This type of interworking has been specified by 3GGP standardization bodies and can thus be implemented according to those standards.

However, in case of multimedia calls, in particular of video calls, the situation is different. Such multimedia or video calls are an important feature of newer 3G networks. Nevertheless, there is currently no agreed standards for a video call interworking between IMS and CS core networks. For example, a video call uses the H.324M protocol suite in CS core networks while SIP is used in IMS system. It is difficult to establish a proper interworking between SIP and H.324M, especially in calls from the IMS domain that have not been addressed in any standards.

Many of the interworking cases can be established with direct SIP SDP (Session Description Protocol) and 3G UE terminal capabilities mapping but in some cases the IMS originated call arrives at the CS core network without an initial description of media supported by the calling party, for example in the form of a SDP description. In such a case, the CS core network is not able to determine whether a speech call or a video call is to be established.

In other words, when a SIP terminal does not provide its media capabilities in the initial phase of the call, for example in an INVITE message that it sends towards the CS core network, difficulties arise to determine which type of call is to be established. The missing of information on the media capability, i.e. the missing of the SDP description in the initial messaging, can occur, for example, in case of a so-called third party call control as described in RFC3725. Another possibility is when a 3G-H.323M terminal originated flow is routed back from the IMS domain to the CS network, for example due to a call forwarding which is a basic supplementary service. Furthermore, a SDP may missing when SIP is used to bridge between ITU-T based multimedia calls. It is to be noted that there are conceivable also other cases where an initial media capability indication is not received at the CS network from the IMS side.

When the media capability information is not received, the CS core network (i.e. the respective control element like a Mobile Switching Center MSC) does not know whether the SIP client which is the calling party, is willing or capable of making a video call. The CS core network control element has no means to know what kind of a call is to be established towards the 3G UE.

Figure 6:
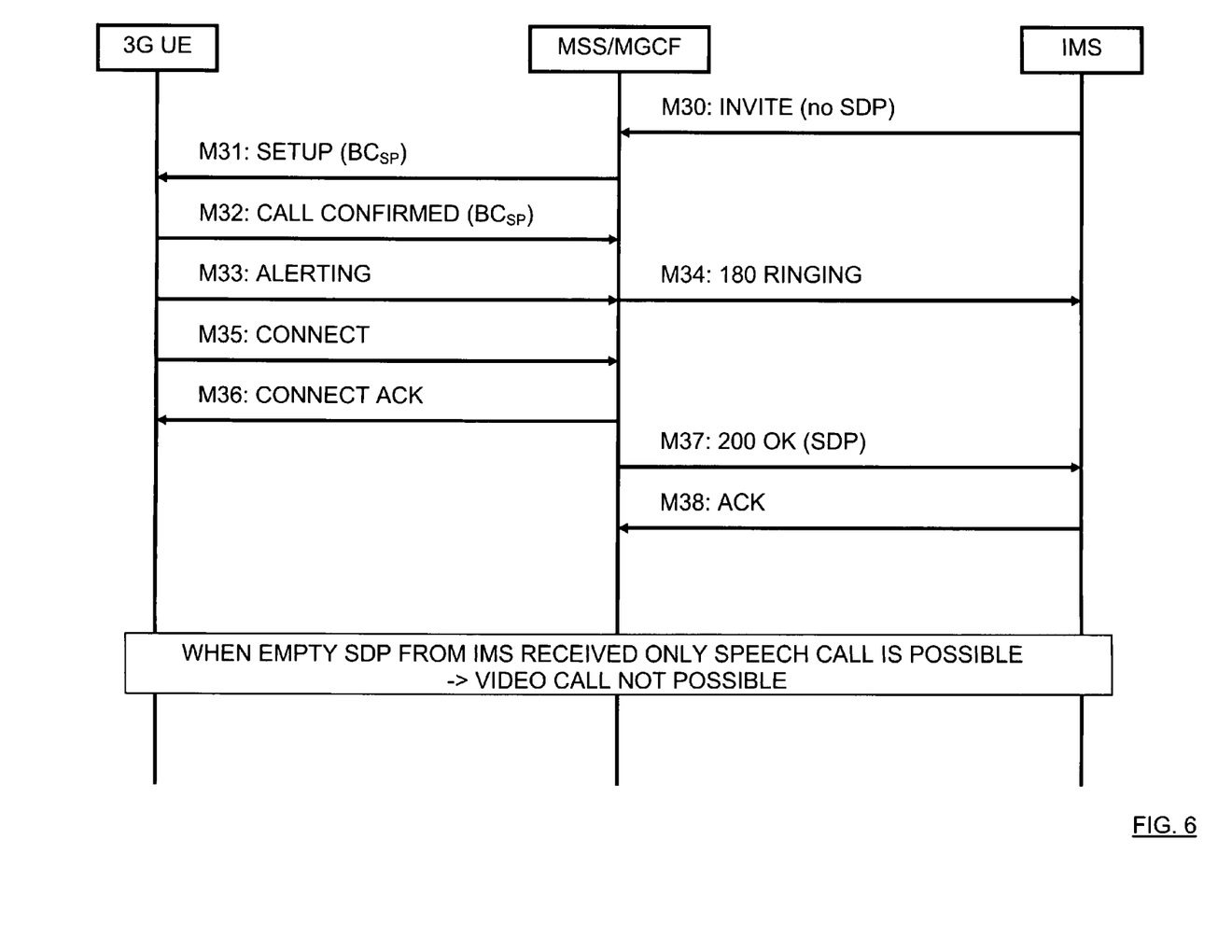
FIG. 6 shows a signaling diagram illustrating an exemplary operation for a conventional call establishment.

In FIG. 6, a signaling diagram is shown which illustrates a conventional call establishment between a calling party located in the IMS to a receiving party located in a circuit switched 3G network. The call establishment is controlled by a network control element, for example a MSC Server (MSS) which comprises a Media Gateway Control Function (MGCF). The MGCF is a gateway which enables communication between IMS and CS users. It is to be noted that the signaling diagram in FIG. 6 is showing the procedure in a simplified manner. As known by those skilled in the art, there are several other network elements and additional signaling messages involved in the call establishment control.

According to FIG. 6, the IMS sends an INVITE message (M30) towards the CS core network, i.e. to the MSS/MGCF, for initializing the call. As mentioned above, the INVITE message does not contain any SDP descriptor for defining the media supported by the SIP terminal in the IMS and the desired call mode (for example, speech or voice). Thus, the MSS/MGCF is not aware about the type of the call to be established. Then, with message M31, the MSS/MGCF sends a SETUP message comprising a Bearer Capability information indicating speech ($BC_{SP}$) to the 3G user equipment. The 3G UE responds with message M32 CALL CONFIRMED in which the bearer capability (speech) which is supported by the 3G UE is confirmed. In the following messages M33 ALERTING, M35 CONNECT, and M36 CONNECT ACK between the 3G UE and the MSS/MGCF as well as messages M34 180 RINGING, M37 200 OK (SDP), and M38 ACK between the MSS/MGCF and IMS, a speech call is established by the MSS/MGCF for the call irrespective of whether or not the SIP terminal, i.e. the calling side, wanted such a call to be setup. In other words, by means of the conventional call establishment control, it is not possible to establish a video call even if the calling party intended to do so and the receiving party is able to perform such a call.

As mentioned above, conventionally only a speech call is always established. Alternatively, the call may also be torn down which is no desirable solution. This means, when speech call is always selected as the call mode, then a video call is not possible to be established. However, if a video call is established instead and it later becomes evident that the SIP terminal wanted to establish a speech call, or in case the SIP terminal only supports speech call, then the video call in the CS core can only carry the speech component while resources for a video call are also reserved (and charged). This means an expensive call for the receiving party especially if the called party is roaming. Since such a high charging is no desired option, the only way is to always make a speech in this kind of call case.

SUMMARY OF THE INVENTION

Thus, it is an object of the invention to provide an improved mechanism for controlling the establishment of a call between a calling party in a first network environment, such as IMS, to a receiving party in a second network environment, such as a CS 3G communication network, wherein by means of this mechanism also the establishment of a multimedia call, for example a video call, is possible when the initial messaging does not include information about the media supported by the calling party.

This object is achieved by the measures defined in the attached claims.

In particular, according to one aspect of the proposed solution, there is provided, for example, a method comprising controlling an establishment of a call from a calling party being located in a first communication network environment to a receiving party being located in a second network environment, determining whether or not information on media parameters supported by the calling party is received in an initialization message for the call, and if the information on media parameters supported by the calling party is not received, sending, at a network control element, a specific message based on a service change and fallback function to the receiving party, responding, at the receiving party, to the specific message based on the service change and fallback function and forwarding information on media parameters supported by the receiving party to the network control element, processing, at the network control element, the information on media parameters supported by the receiving party and completing the establishment of the call.

Furthermore, according to one aspect of the proposed solution, there is provided, for example, a system comprising network elements for controlling an establishment of a call from a calling party being located in a first communication network environment to a receiving party being located in a second network environment, said network elements being configured to determine whether information on media parameters supported by the calling party is received in an initialization message for the call, and if the information on media parameters supported by the calling party is not received, send a specific message based on a service change and fallback function to the receiving party, respond to the specific message based on the service change and fallback function and to forward information on media parameters supported by the receiving party, process the information on media parameters supported by the receiving party and complete the establishment of the call.

Moreover, according to one aspect of the proposed solution, there is provided, for example, an apparatus comprising a network control element for controlling an establishment of a call from a calling party being located in a first communication network environment to a receiving party being located in a second network environment, said network control element being configured to determine whether or not information on media parameters supported by the calling party is received in an initialization message for the call, and if the information on media parameters supported by the calling party is not received, send a specific message based on a service change and fallback function to the receiving party, receive information on media parameters supported by the receiving party, process the information on media parameters supported by the receiving party and assist to complete the establishment of the call.

Similarly, according to one aspect of the proposed solution, there is provided, for example, an apparatus comprising a network control element for controlling an establishment of a call from a calling party being located in a first communication network environment to a receiving party being located in a second network environment, said network control element comprises determining means for determining whether or not information on media parameters supported by the calling party is received in an initialization message for the call, and if the information on media parameters supported by the calling party is not received, transmission means for sending a specific message based on a service change and fallback function to the receiving party, receiving means for receiving information on media parameters supported by the receiving party, processing means for processing the information on media parameters supported by the receiving party and means usable to assist to complete the establishment of the call.

In addition, according to one aspect of the proposed solution, there is provided, for example, a computer program product for a computer, comprising software code portions for making, when said product is run on the computer, said computer to function as a control element usable for controlling an establishment of a call from a calling party being located in a first communication network environment to a receiving party being located in a second network environment, the computer program product is configured to execute steps of determining whether or not information on media parameters supported by the calling party is received in an initialization message for the call, and if the information on media parameters supported by the calling party is not received, sending, at a network control element, a specific message based on a service change and fallback function to the receiving party, receiving information on media parameters supported by the receiving party to the network control element, processing, at the network control element, the information on media parameters supported by the receiving party and assisting to complete the establishment of the call.

According to further refinements, the proposed solution may comprise one or more of the following features:
- the processing may further comprise a determination of media parameters supported by the receiving party, and a transmission of data indicating the media parameters supported by the receiving party to the calling party;
- at the network control element, information indicating media parameters supported by the calling party may be received, and a call mode of the receiving party may be modified in accordance with the media parameters supported by the calling party.
- in the network control element, capabilities of the receiving party and the calling party may be compared on the basis of the respective media parameters, wherein a modification of the call mode of the receiving party may be executed when the capabilities are compatible;
- the specific message based on the service change and fallback function may comprise information indicating a primary service and a less preferred service for a call mode used for the call to be established; in this case, the primary service may be a speech communication service and the less preferred service may be a multimedia communication service;
- in case the receiving party is not able to support the service change and fallback function, the network control element may select a predetermined call mode for the call to be established;
- in case at least one of the receiving party and the calling party is not able to support the primary service or the less preferred service, the network control elements may decide to establish the call on the basis of the respective other service;
- the first network environment may be an IP multimedia subsystem and the second network environment may be a circuit switched telecommunication network; then the network control element may be a mobile switching center comprising a media gateway control function.

By virtue of the proposed solutions, the following advantages can be achieved:
- It is possible to successfully establish multimedia calls, in particular video calls, from the IMS domain to the CS core network even if the video call is to be established out of a SIP call without SDP entering the CS domain. In other words, by means of the present invention presents there is provided a mechanism whereby the call establishment in the CS Core is made so that final call between a IMS SIP client and a CS core 3G UE can be a multimedia (video) call
- By using a service change and fallback function such as a Service Change and UDI/RDI (Unrestricted Digital Information/Restricted Digital Information) Fallback (SCUDIF) function for the call establishment between parties in different network environments, such as IMS terminal and 3G video capable terminal, it is possible to provide an improved mechanism for establishing video calls instead of only speech calls when the 3G UE supports SCUDIF. By establishing the SCUDIF call as speech being the primary service the CS Core network reserves the same resources for the call as in any speech call. The call stays a speech in the CS Core as long as the SIP terminal informs of its video capability. When the SIP terminal capabilities are known the call can be upgraded to become a video call. If the call cannot be upgraded to a video call then the only speech call resources are reserved from the CS core network and charging is the same as for the speech call which is important for the end user.

The invention is easy to implement. There are no changes needed to the IMS side. The MSC server detects the call case and can setup the correct type of call towards the 3G UE.

The above and still further objects, features and advantages of the invention will become more apparent upon referring to the description and the accompanying drawings.

DESCRIPTION OF PREFERRED EMBODIMENTS

In the following, embodiments of the present invention are described with reference to the drawings. For illustrating the present invention, the preferred embodiments will be described in a 3G network environment comprising mobile access network subsystem and core network subsystem components according to the 3GGP specifications. However, it is to be noted that the present invention is not limited to an application in such a network environment but is also applicable in other network types.

Figure 1:
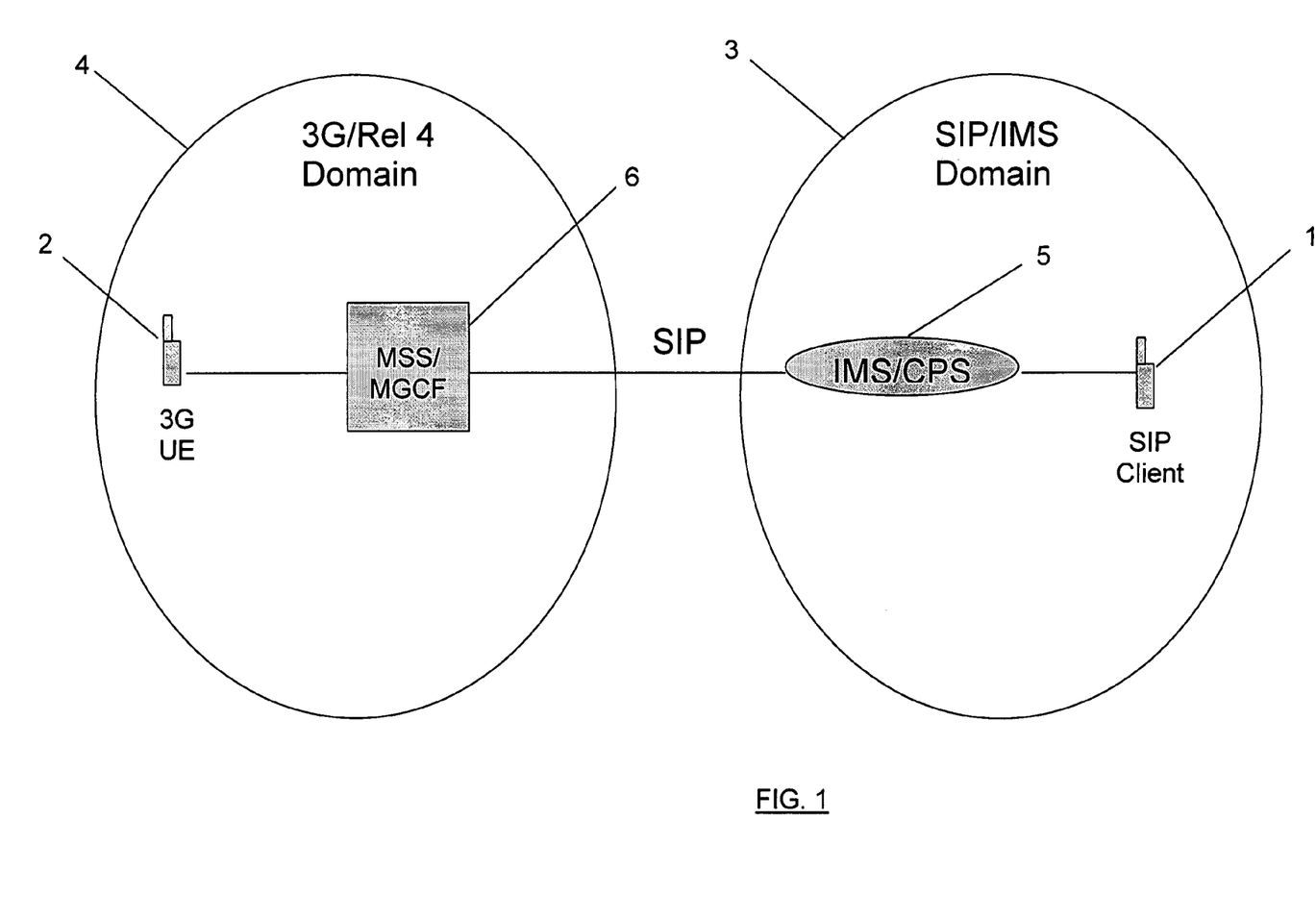
FIG. 1 shows a diagram of a simplified structure of a network environment in which an embodiment of the present invention is applicable.

In FIG. 1, a schematic block diagram of a basic network environment of a communication network is shown. It is to be noted that the structure according to FIG. 1 represents only a simplified example of an architecture of a communication network environment in which the present invention is applicable. As known by those skilled in the art, there are provided several additional network elements and signaling links used for a communication connection. However, for the sake of simplicity, only those elements are depicted which are necessary for describing the invention.

Furthermore, the network elements and their functions described herein may be implemented by software, e.g. by a computer program product for a computer, or by hardware. In any case, for executing their respective functions, correspondingly used devices, such as a communication equipment, core network control element like a mobile switching centre MSC, an access network subsystem element like a Base Station Subsystem BSS element or Radio Access Network RAN element and the like, comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like. Similar to that, the second network environment, i.e. the IMS domain, may comprise several elements and/or functionalities not shown which are known, however, to a person skilled in the art and therefore not described in greater detail herein.

According to FIG. 1, reference sign 1 denotes a SIP client being located in an IMS environment 3. In the present embodiment, the SIP client 1 is the calling party trying to establish a communication connection to another receiving party. The IMS 3 comprises an IMS Call Processing Server (CMS) 5 which controls a communication connection to and from the IMS domain.

The receiving party, on the other hand, is according to the present embodiment a 3G user equipment (UE) 2 in the present embodiment. The 3G UE is located, for example, in a circuit switched 3G network environment 4 according to 3GGP Rel. 4 standard. The 3G network environment comprises a MSC server (MSS) 6 as a call control entity which includes further a MGCF as a gateway enabling a communication between the 3G core network and the IMS. The connection between the IMS domain 3 and the 3G domain 4, i.e. between the respective control entities 5 and 6, is SIP based, for example.

Figure 2:
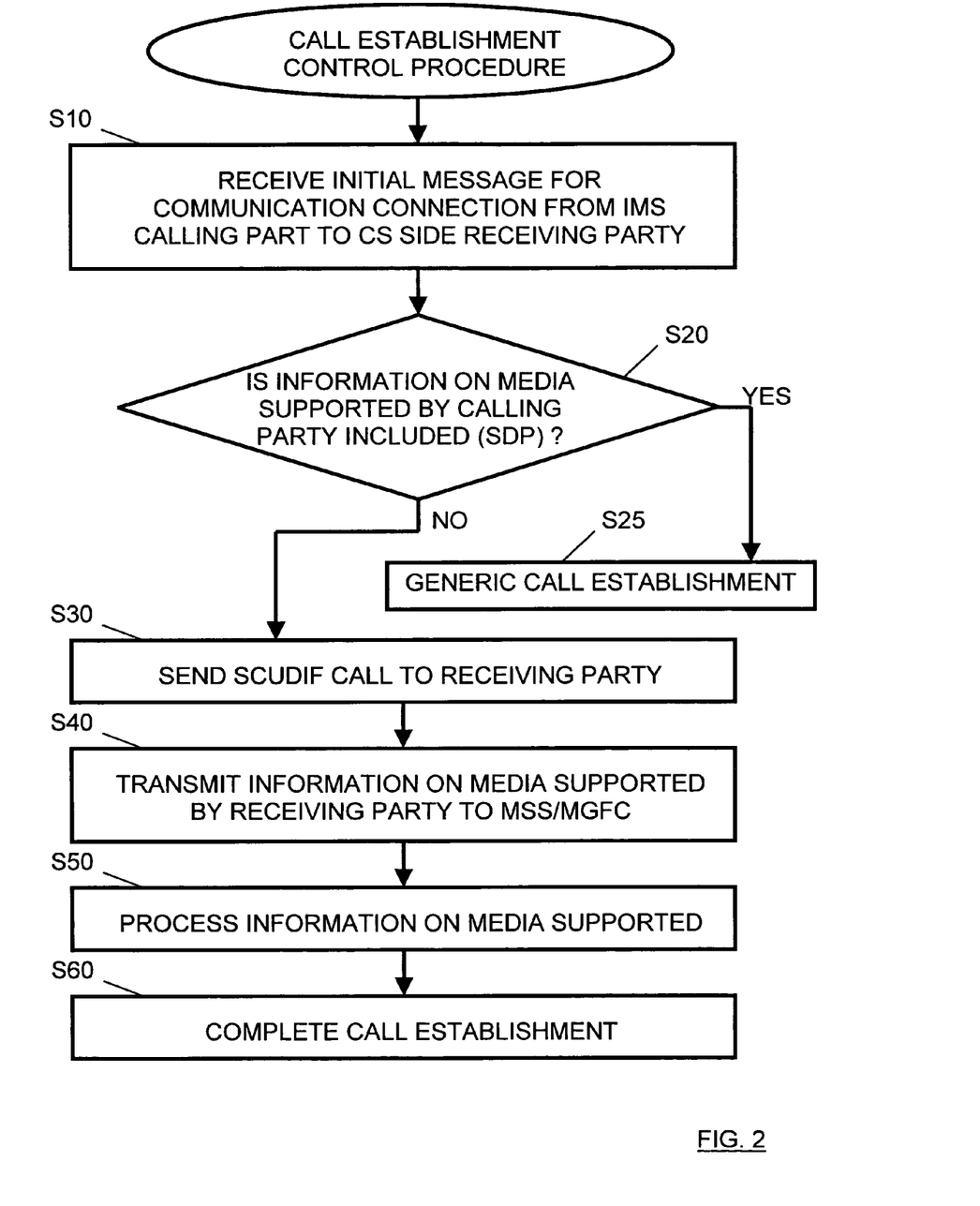
FIG. 2 shows a flow chart illustrating a call establishment procedure according to an embodiment of the present invention.

FIG. 2 shows a flow chart illustrating the general call establishment procedure according to the present invention.

When the call control entity of the 3G network domain, i.e. the MSS/MGCF 6, receives an initialization message for a communication connection originating from the IMS domain 3 in step S10, and determines that the call is to be established towards a receiving party 2 located in its domain, it is determined in step S20 whether or not information on media parameters are included in the initializing message which information indicates the media supported by the calling party in the IMS domain, such as multimedia capabilities, codecs to be used and the like. This information is included in the initializing message, for example, in the form of a SDP descriptor.

In case the SDP descriptor is included and the media supported by the calling party is recognizable, a generic call establishment according to the known standards is executed in step S25 which procedure is known to the person skilled in the art and thus not described herein in further detail.

On the other hand, in case the information on media parameters supported by the calling party is not received by the MSS/MGCF 3, it judges that there is no knowledge about the call type to be established due to the request of the calling party in the initializing message. Therefore, according to the present invention, the MSS/MGCF 3 decides to activate a SCUDIF function in order to prepare a specific message in the form of a so called SCUDIF call towards the receiving party indicated in the initializing message from the calling party.

SCUDUF is function standardized, for example, in the 3GGP specification TS 23.172 V5.6.0 which applies to multimedia calls and allows to fallback to speech during call setup, i.e. allows a user to attempt to set up a multimedia call, and try a speech connection if the former doesn't succeed; to fallback to a less preferred service (speech or multimedia)

during call setup, i.e. allows the terminating side via specific settings for this service in the terminal to accept or reject a multimedia call, without interrupting the call setup; to fallback to the preferred service (speech or multimedia) or speech during call setup, i.e. allows the call setup to proceed with a single service if the transit network does not support the signaling of this functionality; to perform bearer capability (BC) negotiation at the terminating side, i.e. allows the terminating side via specific settings for this service in the terminal to turn a speech call (with service change) into a multimedia call and vice-versa; to perform a service change, i.e. allows a speech call to be turned to multimedia by either of parties, and back to speech, through a successful in call modification procedure; to allow any of the users to reject a multimedia request from the other party while in speech mode. However, SCUDIF is conventionally arranged to perform a fallback to the primary service (i.e. either speech, which is the most common setting for the primary service, or multimedia) in case of an interworking between networks and the SCUDIF function is not supported end to end.

According to the present invention, in case a non-SCUDIF call, for example a SIP call, wherein SIP is not supporting SCUDIF, enters a SCUDIF capable network, the incoming call is changed by the network control element to a SCUDIF call. Thus, it is possible to complete the original incoming SIP call entering, for example, the CS domain without a description of the media supported by the calling (SIP) party (i.e. without a SDP descriptor, for example), not only as a speech call but in a call mode which is desired (and actually supported) by the calling party. As mentioned above, conventionally, the call mode to be used for such a situation (i.e. without information on the media supported) had to be established as a speech call or had to be torn down. Now, by using, for example, the functionality of SCUDIF in a hitherto unknown form, it is also possible that a video call (multimedia call) or the like is established.

For this purpose, according to the present invention, when in step S20 the missing of the SDP descriptor is determined, the MSS/MGCF 6 generates a SCUDIF call as a specific message based on a service change and fallback function and sends it towards the receiving party, i.e. the 3G UE 2 (step S30). In this SCUDIF call, information indicating a primary service and a less preferred service for a call mode used for the call to be established are indicated. Preferably, according to this embodiment, the primary service is a speech communication service and the less preferred service is a multimedia communication service. However, the primary and less preferred services may also be other call modes.

In the present embodiment, when the SCUDIF call to the receiving party is established, the primary service is speech and the less preferred service is multimedia (video). Now the receiving UE 2 may be one of different types: a terminal that can support SCUDIF, a terminal that can not support SCUDIF, a terminal that supports only H.324M video call or a terminal being of an older or less sophisticated type with speech only support.

In dependence of the type of the receiving party's terminal, in step S40, the 3G UE 2 responds to the specific message (i.e. the SCUDIF call) from the network control element MSS/MGCF 6 and forwards information on media parameters supported by itself. After receiving this information in response to the SCUDIF call, the MSS/MGCF 6 processes this information of the receiving party in order to determine the media and/or call mode which is usable for the call to be established between the calling party 1 and the receiving party 2. Then, it completes, on the basis of this processing the call establishment.

Figure 5:
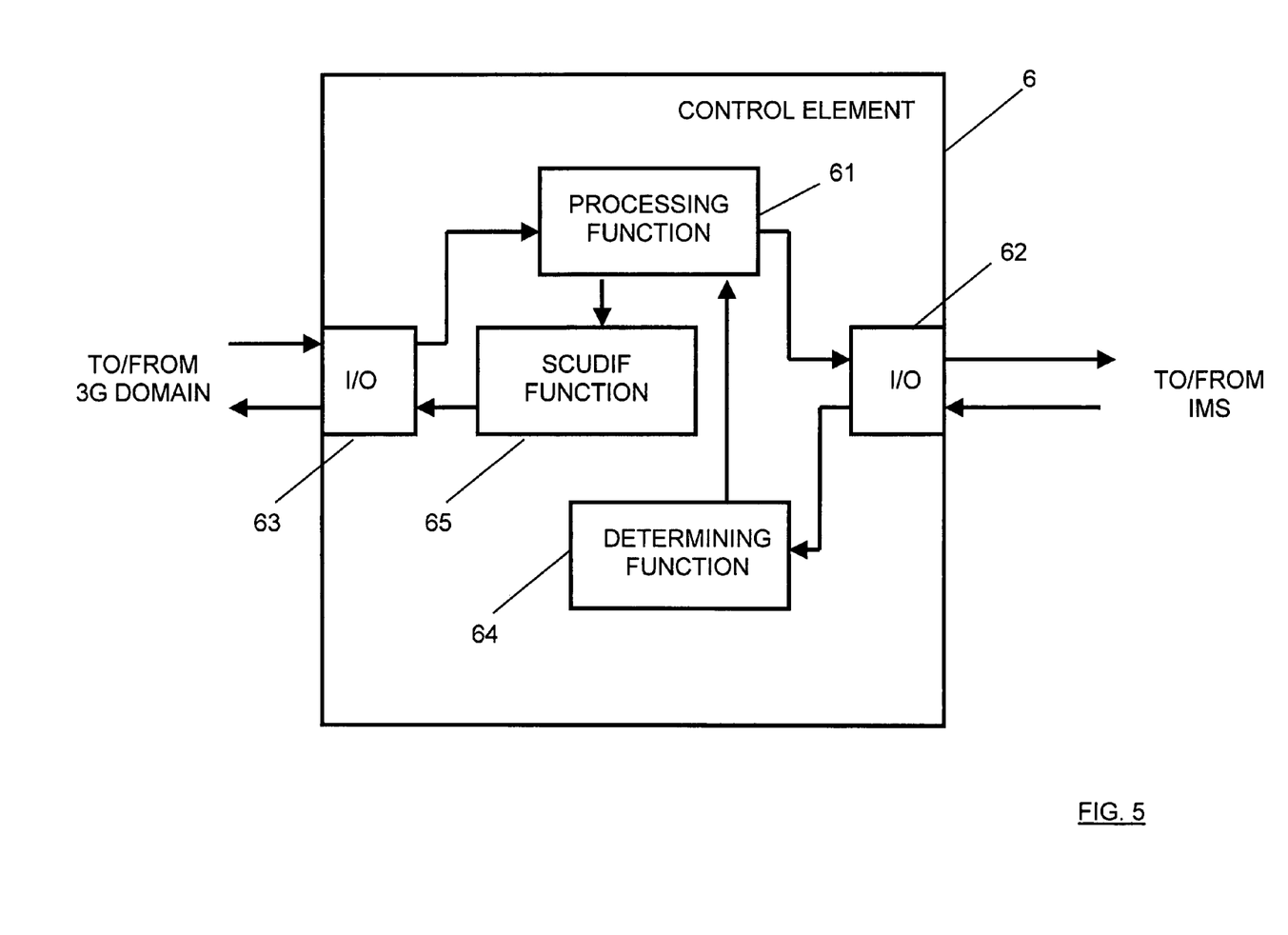
FIG. 5 shows a block circuit diagram of a network control element according to an embodiment of the present invention.

In FIG. 5, a diagram of functional blocks of a network control element involved in the call establishment procedure according to the present invention is shown. The network control element, which is preferably a MSS/MGCF 6 as shown in FIG. 1, comprises not only the call control functions which are known to those skilled in the art, but also a SCUDIF functionality. As mentioned above, the MSC server detects the call case and can setup the correct type of call towards the 3G UE. For this purpose, the MSS/MGCF 6 comprises a processing function or unit, such as a CPU and corresponding memories (RAM, ROM and the like), input/output (I/O) means 62, 63 for connection to and from the IMS 3 and the 3G domain 4, a determining function for determining the presence or absence of the information on media supported by the calling party, and a SCUDIF function 65 for preparing and forwarding the specific message, i.e. the SCUDIF call, towards the 3G UE 2. The arrows indicated in FIG. 5 show the message flow which will be described in further detail below. In this connection, it is to be noted that the message flow originating from the receiving party and forwarded to the calling party, i.e. the message flow in response to the SCUDIF call to the 3G UE 2 is illustrated to go directly from the I/O unit 63 to the processing function 61 and from there to the I/O unit 62. This means that the information included in the message from the receiving party in response to the SCUDIF call are processed by the processing function which will then initialize the further necessary steps to be executed for establishing the end to end call. Furthermore, even though FIG. 5 shows the respective functional blocks separately, it is to be understood that the blocks can be combined in one functional unit, or that the functions can reside in separate elements connected by respective connection means.

In the following, referring to FIGS. 3 and 4, two examples of a call establishment according to the present embodiment are shown in connection with a respective signaling diagram. It is to be noted that the present invention is not limited to the specific details shown in these signaling diagrams but that also other signaling messages and/or network elements can be used for the establishment of the call as long as the general principle of the present invention regarding the usage of a service change and fallback function in case of missing media parameters of the calling party is used.

Figure 3:
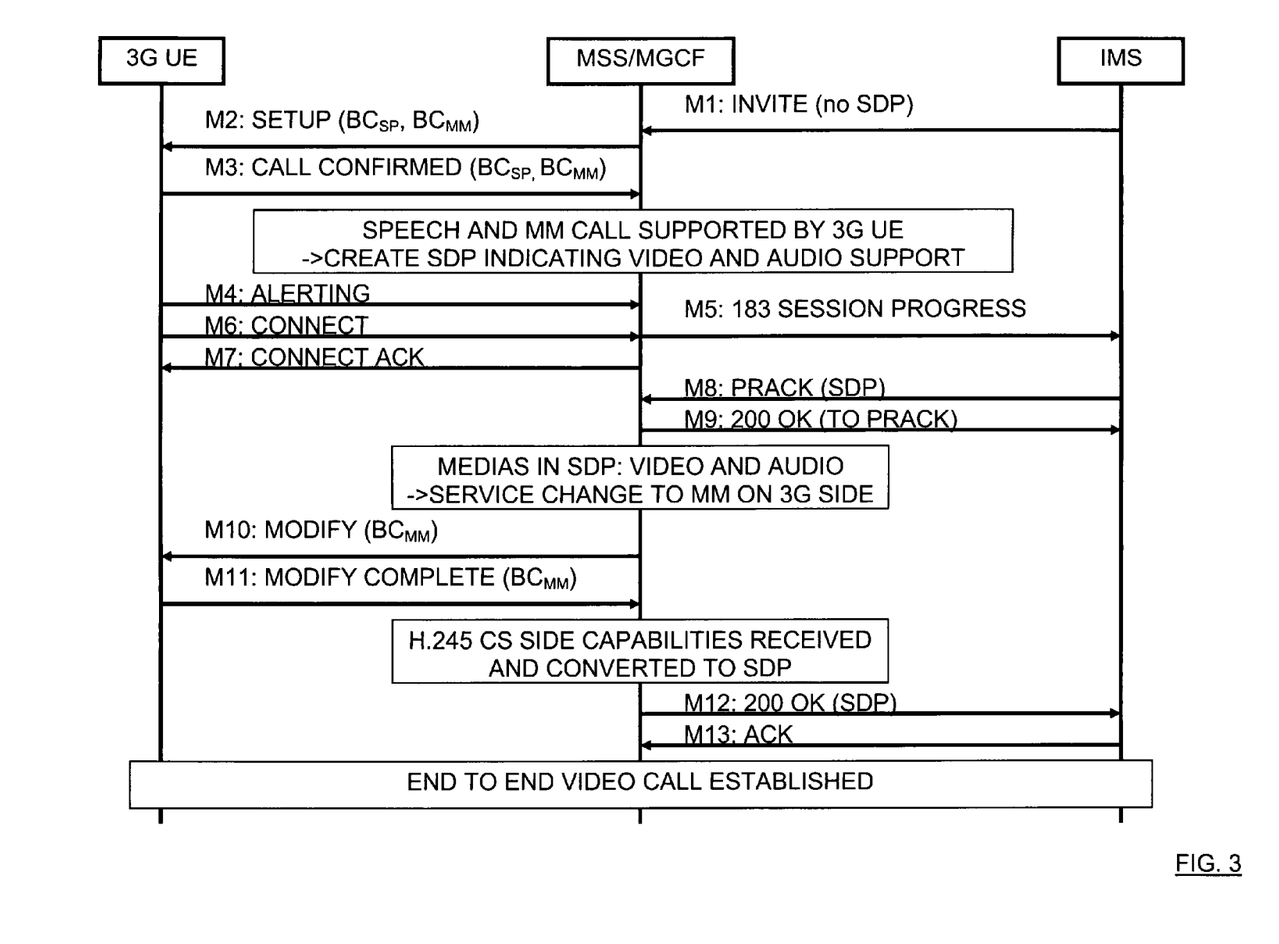
FIG. 3 shows a signaling diagram illustrating an exemplary operation for a call establishment according to an embodiment of the present invention.

In FIG. 3, there is shown a case where a SIP call coming from a calling party located in the IMS is received by the MSS/MGCF (INVITE message M1). The SIP call does not include a SDP descriptor element which may occur in cases described above. The MSS/MGCF detects the absence of the SDP and prepares and forwards a specific message by establishing a SCUDIF call to the receiving party (message M2). The specific message may have the form of a SETUP message and comprises information indicating both speech and video capability ($BC_{SP}$, $BC_{MM}$). In this example, the SCUDIF call is established so that the primary service is speech and the less preferred service is multimedia (video).

When the receiving party's terminal is able to support SCUDIF, it responds to the SCUDIF call SETUP message M2 with message M3 CALL CONFIRMED message and indicates the media supported by means of information on speech and video capability ($BC_{SP}$, $BC_{MM}$).

Then, the MSS/MGCF determines the media parameters supported by the receiving party and judges that speech and multimedia (video) services are supported by the 3G UE and a corresponding call mode is available for the communication connection. Thereafter, the MSS/MGCF creates a SDP descriptor indicating the audio and video support of the receiving party, and sends it in message M5 to the IMS, i.e. the calling party, by means of a 183 SESSION PROGRESS message which is used to convey information about the progress of the call. In response to the 183 SESSION PROGRESS message, the IMS side responds by means of a provisional response acknowledgment message PRACK M8 and sends the information on media parameters supported by the calling party to the MSS/MGCF (SDP). The MSS/MGCF confirms the receipt of the PRACK message by means of a 200 OK message M9 towards the IMS.

In parallel to the signaling between the MSS/MGCF and the IMS, the receiving party's terminal and the MSS/MGCF executes an exchange of messages M4 ALERTING, M6 CONNECT and M7 CONNECT ACK for starting the establishment of a communication connection.

When the MSS/MGCF receives the PRACK message from the IMS, it has also received an SDP descriptor indicating the media parameters supported by the calling party. Then, it is possible to compare the capabilities of the receiving party and the calling party on the basis of the respective media parameters, and to determine which call mode is to be selected, i.e. which call mode is actually desired by the calling party (speech call only or video call, for example). If the comparison results in the determination that not only a speech call is to be established but a video call, the call mode for the connection towards the receiving party is to be changed since the initial SCUDIF call indicated that speech is the primary service. Hence, a call mode modification to multimedia on the 3G side is executed.

Hence, in message M10, the MSS/MGCF sends a MODIFY message indicating the bearer capability related to multimedia ($BC_{MM}$) to the 3G UE. The SCUDIF supporting 3G UE responds in message M11 by means of a MODIFY COMPLETE message indicating the multimedia bearer capability for confirming the modification of the call mode. Thus, the multimedia capability of the receiving side, for example, the H.245 capabilities of the CS side terminal are received by the MSS/MGCF and will then be converted to a SDP information. This SDP is then transferred to the IMS side by means of message M12 200 OK and acknowledged by message M13 ACK. Thus, an end to end video call is established between the IMS located calling party and the CS network located receiving party.

Figure 4:
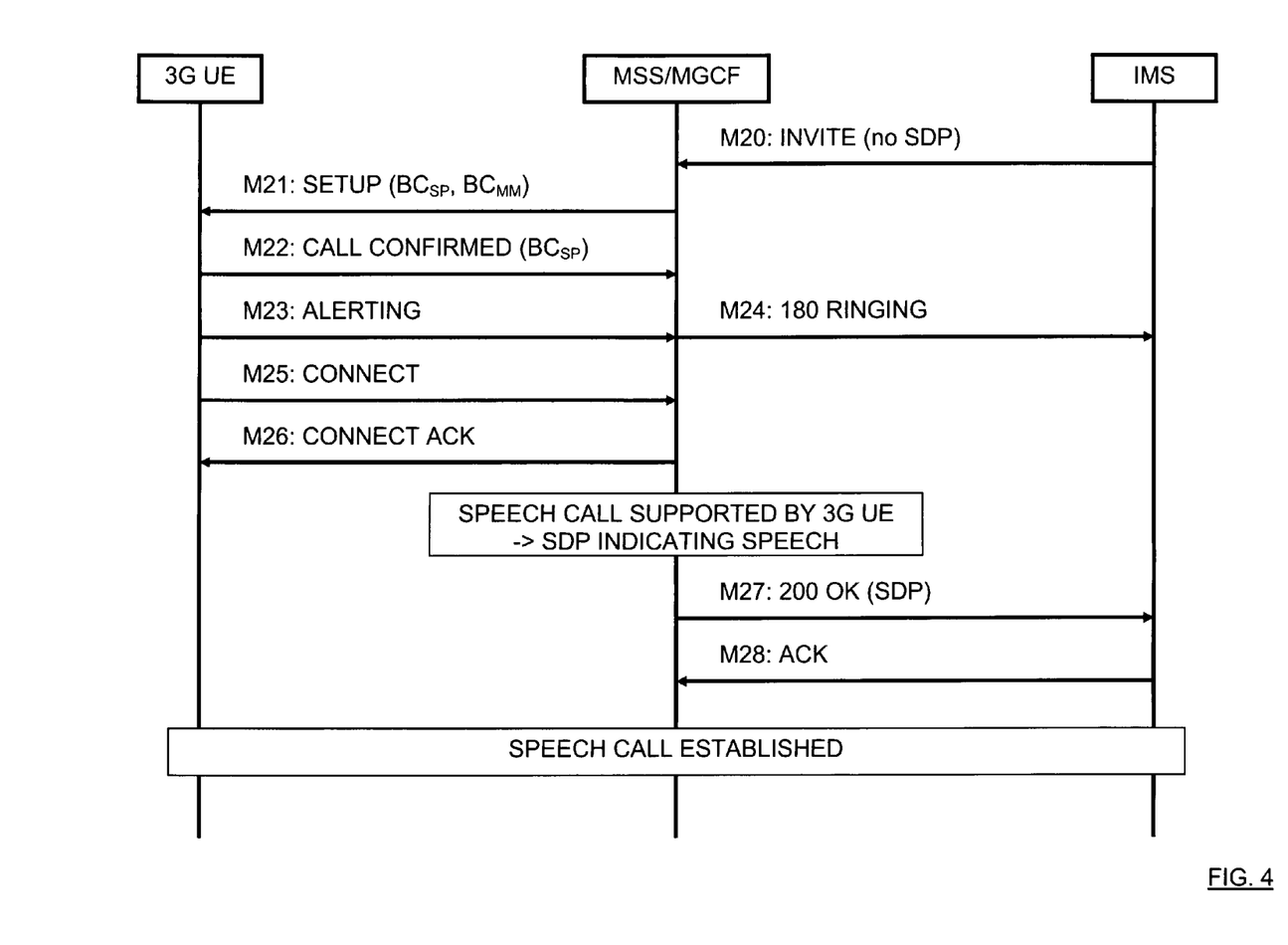
FIG. 4 shows a signaling diagram illustrating an further exemplary operation for a call establishment according to an embodiment of the present invention.

In FIG. 4, an example of a messaging diagram is shown where the call establishment procedure according to the present embodiment is employed in case of a receiving party's terminal not supporting multimedia.

Similar to the case shown in FIG. 3, a SIP call coming from a calling party located in the IMS is received by the MSS/MGCF (INVITE message M20). The SIP call does not include a SDP descriptor element which may occur in cases described above. The MSS/MGCF detects the absence of the SDP and prepares and forwards a specific message by establishing a SCUDIF call to the receiving party (message M21). The specific message may have the form of a SETUP message and comprises information indicating both speech and video capability ($BC_{SP}$, $BC_{MM}$). Also in this example, the SCUDIF call is established so that the primary service is speech and the less preferred service is multimedia (video).

When the receiving party's terminal is a legacy terminal or does not support SCUDIF, it responds to the SCUDIF call SETUP message M21 with message M22 CALL CONFIRMED message and indicates the media supported by means of information on speech only capability ($BC_{SP}$).

After receiving the message M22 CALL CONFIRMED message which indicates the media supported as speech only ($BC_{SP}$), the MSS/MGCF sends a message M24 180 RINGING to the IMS for further processing the call establishment. In parallel to the signaling between the MSS/MGCF and the IMS, the receiving party's terminal and the MSS/MGCF executes an exchange of messages M23 ALERTING, M25 CONNECT and M26 CONNECT ACK for starting the establishment of a communication connection.

After the communication connection between the MSS/MGCF and the 3G UE is established, it is known that only a speech call is supported by the 3G UE. Therefore, the MSS/MGCF creates a SDP descriptor indicating the speech capability for informing the IMS side about the call mode (speech) to be used for the call. This is forwarded to the IMS (i.e. the calling party) by means of message M27 200 OK which comprises the corresponding SDP. The message M27 is acknowledged by the IMS with message M28 ACK and the call mode speech is confirmed. Thereafter, an end to end speech call is established.

It is to be noted that in the example according to FIG. 4 no modification of the connection is necessary since the primary service indicated in the SCUDIF call message M21 is speech service. However, in case another service type is selected as primary service, for example multimedia, a corresponding modification would be necessary.

As mentioned above, the present invention is applicable in cases where an initial message from a calling party does not include information on media parameters supported by the calling party. The invention provides the possibility of establishing a call irrespective of the type of the receiving party (i.e. supporting SCUDIF, not supporting SCUDIF, supporting only H.324M video call or a terminal with speech only support). If the receiving 3G terminal supports SCUDIF then the call can be made as a video call when the SIP terminal supports video and audio. In any case the call is successful either as a video call or as a speech call. This means, for example, in case the receiving party is not able to support the service change and fallback function (e.g. SCUDIF), the network control element selects a predetermined call mode for the call to be established, preferably speech. In case at least one of the receiving party and the calling party is not able to support the primary service or the less preferred service, in particular multimedia or video, the network control elements decides to establish the call on the basis of the respective other service, in particular speech. However, due to the preceding SCUDIF call, only resources for a speech call are reserved so that the network load is reduced and the unnecessary charging for a video call is avoided.

Even though the present invention is described in connection with IMS, CS 3G networks, SIP call, SCUDIF call and multimedia call, it is understandable that the principle of the present invention is also applicable to other network environments and call types. Even in other network environments, in case of an initial message not comprising the media information supported by the calling party, a service change and fallback function can be used according to the present invention in order to perform a suitable establishment of a call mode as desired and supported by the calling and the receiving party.

As described above, a mechanism for controlling an establishment of a call from a calling party being located in a first communication network environment to a receiving party being located in a second network environment, comprise a determination whether or not information on media parameters supported by the calling party is received in an initialization message for the call, and if the information on media parameters supported by the calling party is not received, a transmission of a specific message based on a service change and fallback function to the receiving party, a receipt, in response to the specific message based on the service change and fallback function, of information on media parameters supported by the receiving party, processing of the information on media parameters supported by the receiving party and a completion of the establishment of the call in correspondence to the media parameters supported by the receiving party and by the calling party.

It should be understood that the above description and accompanying figures are merely intended to illustrate the present invention by way of example only. The preferred embodiments of the present invention may thus vary within the scope of the attached claims.

The invention claimed is:

1. A method, comprising:
   controlling an establishment of a call from a calling party located in a first communication network environment to a receiving party located in a second network environment;
   determining whether information on media parameters supported by the calling party is received in an initialization message for the call, and
   in an instance in which the information on media parameters supported by the calling party is not received:
      causing sending, by a network control element, of a specific message based on a service change and fallback function to the receiving party, the specific message including an indication of a primary service and a less preferred service for a call mode used to establish the call;
      receiving a response to the specific message based on the service change and fallback function from the receiving party, the response comprising information on media parameters supported by the receiving party to the network control element;
      processing, by the network control element, the information on media parameters supported by the receiving party; and
      assisting in completing the establishment of the call;
   wherein the method further comprises selecting a predetermined call mode to establish the call in an instance in which the receiving party is not able to support the service change and the fallback function.

2. The method according to claim 1, wherein said processing further comprises
   determining the media parameters supported by the receiving party, and
   causing transmission of data indicating the media parameters supported by the receiving party to the calling party.

3. The method according to claim 1, further comprising receiving at the network control element information indicating the media parameters supported by the calling party, and
   modifying a call mode of the receiving party in accordance with the media parameters supported by the calling party.

4. The method according to claim 3, further comprising
   comparing, in the network control element, capabilities of the receiving party and the calling party based on the respective media parameters, wherein the modifying is executed when the capabilities of the receiving party and the calling party are compatible.

5. The method according to claim 1, wherein the primary service is a speech communication service and the less preferred service is a multimedia communication service.

6. The method according to claim 1, wherein when at least one of the receiving party and the calling party is not able to support the primary service or the less preferred service, the network control element decides to establish the call based on the respective other service.

7. The method according to claim 1, wherein the first network environment is an IP multimedia subsystem and the second network environment is a circuit switched telecommunication network.

8. A network element comprising at least one processor and at least one memory including computer program code, the at least one memory and the computer program code configured to, with the at least one processor, cause the network element at least to:
   control establishment of a call from a calling party located in a first communication network environment to a receiving party located in a second network environment,
   determine whether information on media parameters supported by the calling party is received in an initialization message for the call, and
   in an instance in which the information on media parameters supported by the calling party is not received:
      cause a specific message based on a service change and fallback function to be sent to the receiving party, the specific message including an indication of a primary service and a less preferred service for a call mode used to establish the call,
      receive a response to the specific message based on the service change and the fallback function and cause forwarding of information on media parameters supported by the receiving party,
      process the information on media parameters supported by the receiving party, and
      cause completion of the establishment of the call;
   wherein the network element is further caused to select a predetermined call mode to establish the call in an instance in which the receiving party is not able to support the service change and the fallback function.

9. The network element according to claim 8, wherein said network element is further caused to:
   determine media parameters supported by the receiving party, and
   transmit data indicating the media parameters supported by the receiving party to the calling party.

10. The system network element according to claim 8, wherein said network element is further caused to:
    receive information indicating the media parameters supported by the calling party, and
    modify a call mode of the receiving party in accordance with the media parameters supported by the calling party.

11. The network element according to claim 10, wherein said network element is further caused to:
    compare capabilities of the receiving party and the calling party based on the respective media parameters, and
    execute a modification of the call mode when the capabilities of the receiving party and the calling party are compatible.

12. The network element according to claim 8, wherein the primary service is a speech communication service and the less preferred service is a multimedia communication service.

13. The network element according to claim 8, wherein the network element is further caused to establish the call based on the respective other service when at least one of the receiving party and the calling party is not able to support the primary service or the less preferred service.

14. The network element according to claim 8, wherein the first network environment is an IP multimedia subsystem and the second network environment is a circuit switched telecommunication network.

15. An apparatus comprising at least one processor and at least one memory including computer program code, the at least one memory and the computer program code configured to, with the at least one processor, direct the apparatus at least to:
    control establishment of a call from a calling party located in a first communication network environment to a receiving party located in a second network environment,
    determine whether information on media parameters supported by the calling party is received in an initialization message for the call, and
    in an instance in which the information on media parameters supported by the calling party is not received:
        cause sending of a specific message based on a service change and fallback function to the receiving party, the specific message including an indication of a primary service and a less preferred service for a call mode used to establish the call,
        receive information on media parameters supported by the receiving party,
        process the information on media parameters supported by the receiving party, and
        assist completion of the establishment of the call;
    wherein the apparatus is further directed to select a predetermined call mode to establish the call in an instance in which the receiving party is not able to support the service change and fallback function.

16. The apparatus according to claim 15, wherein said apparatus is further directed to:
    determine, from the information received, media parameters supported by the receiving party, and
    cause transmission of data indicating the media parameters supported by the receiving party to the calling party.

17. The apparatus according to claim 15, wherein said apparatus is further directed to:
    receive information indicating the media parameters supported by the calling party, and
    modify a call mode of the receiving party in accordance with the media parameters supported by the calling party.

18. The apparatus according to claim 17, wherein said apparatus is further directed to:
    compare capabilities of the receiving party and the calling party based on the respective media parameters, and
    execute a modification of the call mode when the capabilities of the receiving party and the calling party are compatible.

19. The apparatus according to claim 15, wherein the primary service is a speech communication service and the less preferred service is a multimedia communication service.

20. The apparatus according to claim 15, wherein when at least one of the receiving party and the calling party is not able to support the primary service or the less preferred service, the apparatus is further directed to select the respective other service for the establishment of the call.

21. The apparatus according to claim 15, wherein the first network environment is an IP multimedia subsystem and the second network environment is a circuit switched telecommunication network, and wherein the apparatus is a mobile switching center comprising a media gateway control function.

22. A computer program product embodied on a non-transitory computer readable medium, comprising software code portions for directing, when said software code portions are run on a processor, said processor to perform:
    controlling establishment of a call from a calling party located in a first communication network environment to a receiving party located in a second network environment,
    determining whether information on media parameters supported by the calling party is received in an initialization message for the call, and
    in an instance in which the information on media parameters supported by the calling party is not received:
        causing sending of a specific message based on a service change and fallback function to the receiving party, the specific message including an indication of a primary service and a less preferred service for a call mode used to establish the call;
        receiving information on media parameters supported by the receiving party at the network control element;
        processing, at the network control element, the information on media parameters supported by the receiving party; and
        assisting to complete the establishment of the call;
    wherein the software code portions, when executed, direct the processor to also perform selecting a predetermined call mode to establish the call when the receiving party is not able to support the service change and fallback function.

23. The computer program product according to claim 22, wherein said software code portions, when executed, direct the processor to perform:
    determining the media parameters supported by the receiving party; and
    causing transmitting of data indicating the media parameters supported by the receiving party to the calling party.

24. The computer program product according to claim 22, wherein said software code portions, when executed, direct the processor to perform:
    receiving information indicating media parameters supported by the calling party; and
    modifying a call mode of the receiving party in accordance with the media parameters supported by the calling party.

25. The computer program product according to claim 24, wherein said software code portions, when executed, direct the processor to perform:
    comparing capabilities of the receiving party and the calling party based on the respective media parameters, and
    modifying the call mode of the receiving party when the capabilities of the receiving party and the calling party are compatible.

26. The computer program product according to claim 22, wherein the primary service is a speech communication service and the less preferred service is a multimedia communication service.

27. The computer program product according to claim 22, wherein
    the software code portions, when executed, direct the processor to perform selecting the respective other service for the establishment of the call when at least one of the receiving party and the calling party is not able to support the primary service or the less preferred service.

28. The computer program product according to claim 22, wherein the first network environment is an IP multimedia subsystem and the second network environment is a circuit switched telecommunication network, wherein the computer program product is included in a mobile switching center comprising a media gateway control function.

29. An apparatus, comprising:

means for controlling an establishment of a call from a calling party located in a first communication network environment to a receiving party located in a second network environment, means for determining whether information on media parameters supported by the calling party is received in an initialization message for the call, and in an instance in which the information on media parameters supported by the calling party is not received, means for causing sending of a specific message based on a service change and fallback function to the receiving party, the specific message including an indication of a primary service and a less preferred service for a call mode used to establish the call, means for receiving information on media parameters supported by the receiving party, means for processing the information on media parameters supported by the receiving party, means for assisting completion of the establishment of the call, and means for selecting a predetermined call mode to establish the call in an instance in which the receiving party is not able to support the service change and the fallback function.

* * * * *

UNITED STATES PATENT AND TRADEMARK OFFICE
CERTIFICATE OF CORRECTION

| | | |
|---|---|---|
| PATENT NO. | : 7,860,102 B2 | Page 1 of 1 |
| APPLICATION NO. | : 11/508258 | |
| DATED | : December 28, 2010 | |
| INVENTOR(S) | : Kallio et al. | |

It is certified that error appears in the above-identified patent and that said Letters Patent is hereby corrected as shown below:

Column 14,

Line 41, "The system network element" should read --The network element--.

Signed and Sealed this
Fourteenth Day of February, 2012

David J. Kappos
*Director of the United States Patent and Trademark Office*